US012372123B2

(12) United States Patent
Okabe et al.

(10) Patent No.: US 12,372,123 B2
(45) Date of Patent: Jul. 29, 2025

(54) CAM CLUTCH UNIT

(71) Applicant: TSUBAKIMOTO CHAIN CO., Osaka (JP)

(72) Inventors: Masayuki Okabe, Osaka (JP); Akihiro Fukuda, Osaka (JP); Riku Kato, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/763,107

(22) Filed: Jul. 3, 2024

(65) Prior Publication Data

US 2025/0020175 A1   Jan. 16, 2025

(30) Foreign Application Priority Data

Jul. 11, 2023  (JP) ................................. 2023-113907

(51) Int. Cl.
| F16D 41/07 | (2006.01) |
| F16D 41/06 | (2006.01) |

(52) U.S. Cl.
CPC ...... F16D 41/07 (2013.01); *F16D 2041/0605* (2013.01)

(58) Field of Classification Search
CPC . F16D 41/07; F16D 2041/0605; F16D 41/067
See application file for complete search history.

(56) References Cited

U.S. PATENT DOCUMENTS

| 5,183,139 A * | 2/1993 | Malecha ............... F16D 41/067 |
| | | 192/41 R |
| 5,271,486 A * | 12/1993 | Okamoto .............. F16D 41/064 |
| | | 464/30 |
| 5,676,226 A * | 10/1997 | Lampela ................ F16D 41/07 |
| | | 192/113.32 |
| 6,279,708 B1 * | 8/2001 | Yatabe ................... F16D 41/07 |
| | | 192/110 B |
| 2005/0067248 A1 | 3/2005 | Takasu |
| 2006/0266608 A1 * | 11/2006 | Ikeda ..................... F16D 41/07 |
| | | 192/41 A |
| 2014/0050434 A1 * | 2/2014 | Lippert ................. F16C 19/383 |
| | | 384/558 |
| 2016/0040730 A1 * | 2/2016 | Fujiwara ................ F16D 41/07 |
| | | 29/888 |

(Continued)

FOREIGN PATENT DOCUMENTS

| JP | 2005-106135 A | 4/2005 | |
| WO | WO-2020185126 A1 * | 9/2020 | ............... F16H 3/08 |

*Primary Examiner* — Farhana Pervin

(57) ABSTRACT

Provided is a cam clutch unit for which the rotational resistance of rollers can be reduced, the rollers can be arranged at optimum locations, and the weight can be reduced.

The cam clutch unit includes: a plurality of cams and a plurality of rollers aligned in a circumferential direction between an inner ring and an outer ring; a cage ring that includes a plurality of pocket portions that restrict relative movement of the cams and the rollers in the circumferential direction; and an annular spring that biases the cams, the cams each include an engagement portion that is engageable with the spring, the pocket portions that accommodate the rollers are provided at positions not interfering with the spring in an axial direction, and are arranged in a circumferential direction in a different manner on two sides relative to the spring.

6 Claims, 8 Drawing Sheets

(56) References Cited

U.S. PATENT DOCUMENTS

2021/0102576 A1* 4/2021 Loof ................ F16C 23/082
2022/0056965 A1* 2/2022 Kunimatsu ........... F16D 41/088
2023/0341011 A1* 10/2023 Brzus ................ F16C 19/26

* cited by examiner

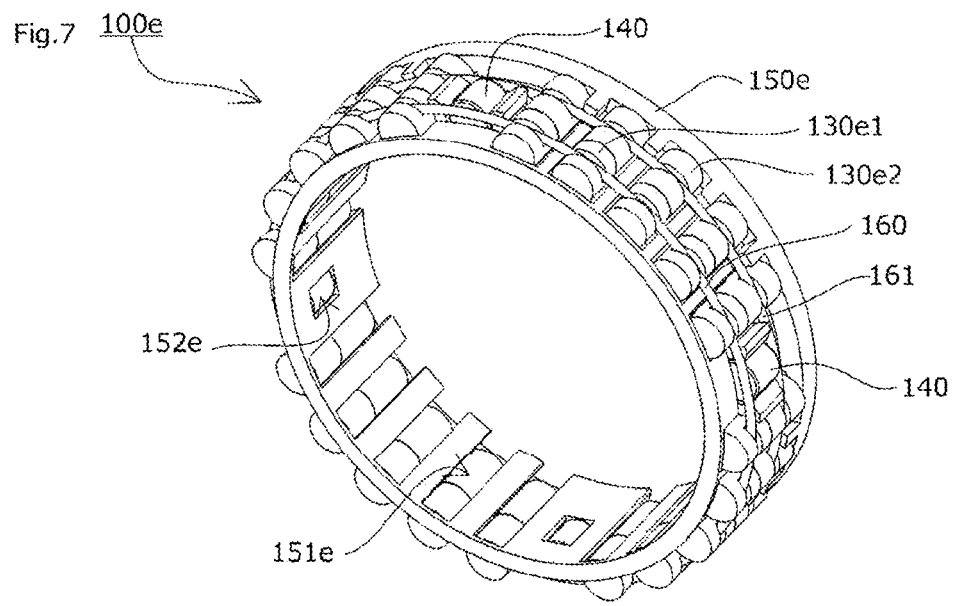
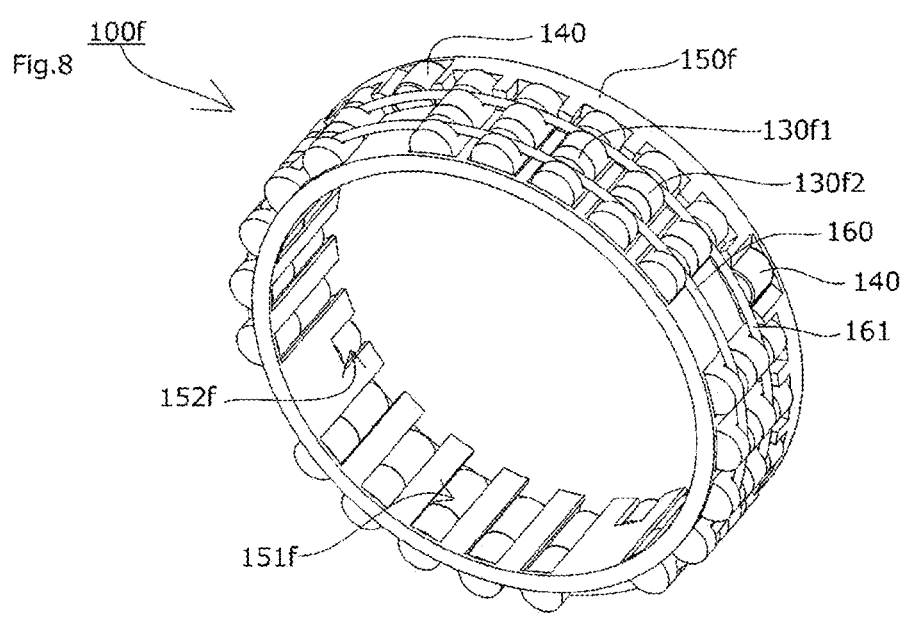

RELATED ART

RELATED ART

RELATED ART

CAM CLUTCH UNIT

BACKGROUND OF THE INVENTION

1. Field of the Invention

The present invention relates to a cam clutch unit in which a torque is transmitted and blocked between an input shaft and an output shaft.

2. Description of the Related Art

There is a known cam clutch that includes a plurality of cams arranged between an inner ring and an outer ring provided so as to be coaxially rotatable relative to each other, a cage ring that includes a plurality of pocket portions that restrict relative movement of the cams in the circumferential direction, and an annular spring that biases the cams (see Japanese Patent Application Laid-open No. 2005-106135, etc.).

It is conceivable that, in such a cam clutch, some of the plurality of cams are replaced with rollers that freely rotate, in order to ensure the coaxiality between the inner ring and the outer ring.

As shown in FIGS. 9 to 13, for example, in a cam clutch unit 500, a plurality of cams 530 and a plurality of rollers 540 are accommodated in pocket portions 551 of a cage ring 550 such that the cams 530 and the rollers 540 are arranged in a circumferential direction between an inner ring and an outer ring provided so as to be coaxially rotatable relative to each other, and relative movement of the cams 530 and the rollers 540 in the circumferential direction is restricted.

A configuration is adopted in which the cams 530 and the rollers 540 respectively include groove portions 535 and 545 extending in the circumferential direction, and an annular spring 560 is accommodated in the groove portions 535 and 545, and biases the cams 530 and the rollers 540 to the inner ring side.

SUMMARY OF THE INVENTION

There has been a problem with such a cam clutch unit in that processing man-hours and the degree of difficulty at the time of manufacturing the cams and the rollers are high, and the width of the cam clutch unit is restricted due to processing and cannot be reduced, since the groove portions that extend in the circumferential direction and accommodate the annular spring are provided at the center in the axial direction of the cams and the rollers for which material that has resistance to abrasion and impact is desired.

In addition, the rollers need to freely rotate while being restricted only in the axial direction, but there has been the problem in that unignorable rotational resistance will occur at the time of high-speed rotation since the spring and a bottom portion or a side portions of a groove portion friction and slide against each other, and there has been a risk that the lifespan of the cam clutch itself will be affected by degradation of the spring caused by abrasion.

In addition, even when the cams are long in the axial direction, the positions in the axial direction of the rollers are restricted by the position of the spring, and thus it is not possible to provide the rollers only at optimum locations in the axial direction, and when rollers elongated in the axial direction cover optimum locations, there has been a risk that extra rolling resistance will occur.

An object of the present invention is to solve the aforementioned issues, and to provide a cam clutch unit for which processing man-hours and the degree of difficulty at the time of manufacturing a cam clutch are low, the rotational resistance of rollers can be reduced, the rollers can be arranged at optimum locations due to a high degree of freedom of the positions thereof, and the weight can be reduced.

In order to solve the aforementioned issues, the present invention is directed to a cam clutch unit that includes: a plurality of cams and a plurality of rollers arranged between an inner ring and an outer ring that are provided so as to be coaxially rotatable relative to each other, a cage ring that includes a plurality of pocket portions that restrict relative movement of the cams and the rollers in a circumferential direction, and at least one annular spring that biases the cams, the cams each include an engagement portion that is engageable with the spring, the pocket portions that accommodate the rollers are provided at positions not interfering with the at least one spring in an axial direction, and the pocket portions that accommodate the plurality of rollers are arranged in the circumferential direction in a different manner on two sides relative to the at least one spring.

In the cam clutch unit according to claim 1, the pocket portions that accommodate the rollers are provided at positions not interfering with the at least one spring in the axial direction, the pocket portions that accommodate the plurality of rollers are arranged in the circumferential direction in a different manner on the two sides relative to the at least one spring, and thereby the rollers can be formed into simple cylindrical shapes, thus lowering the processing man-hours and the degree of difficulty at the time of manufacturing.

In addition, since the positions in the axial direction of the pocket portion that accommodate the rollers are not restricted by the position of the spring, the rollers can be arranged such that the numbers of rollers in the circumferential direction differ in accordance with a position in the axial direction, the roller can be arranged at optimum locations due to a high degree of freedom of the positions thereof, and the weight can be reduced.

Furthermore, the rollers can be arranged at such positions as not to slide against the spring, and the rotational resistance of the rollers can be reduced.

According to the configuration in claim 2, the pocket portions that accommodate the rollers are alternatingly provided in the circumferential direction on the two sides in the axial direction relative to the at least one spring, and thus, the weight can be reduced by reducing the length in the axial direction of the rollers without reducing the number of rollers arranged in the circumferential direction, and the load can be to equally shared between the two sides in the axial direction relative to the spring.

According to the configuration in claim 3, the pocket portions that accommodate the rollers are provided only on one side in the axial direction relative to the at least one spring, and thus the rollers can be arranged only at positions where the largest load is received in the axial direction, extra rolling resistance can be suppressed, and the weight can be reduced.

According to the configuration in claim 4, two or more springs are provided at different positions in the axial direction, and thus the rollers can be freely arranged on the two sides relative to each of the springs, thus improving the degree of freedom.

According to the configuration in claim 5, the cage ring includes a lubrication adjusting portion at a position opposing at least one pocket portion with the spring therebetween, and thus the lubricity property can be improved.

According to the configuration in claim 6, some or all of the pocket portions that accommodate the rollers are arranged to cover areas that are different, in the axial direction, from those of the pocket portions that accommodate the cams, and thus, the degree of freedom of arrangement of the rollers further improves, and the roller can be arranged at optimum positions.

BRIEF DESCRIPTION OF THE DRAWINGS

FIG. 7 is a perspective view of a cam clutch unit according to Embodiment 5 of the present invention;

FIG. 8 is a perspective view of a cam clutch unit according to Embodiment 6 of the present invention;

DESCRIPTION OF THE PREFERRED EMBODIMENTS

Figure 1:
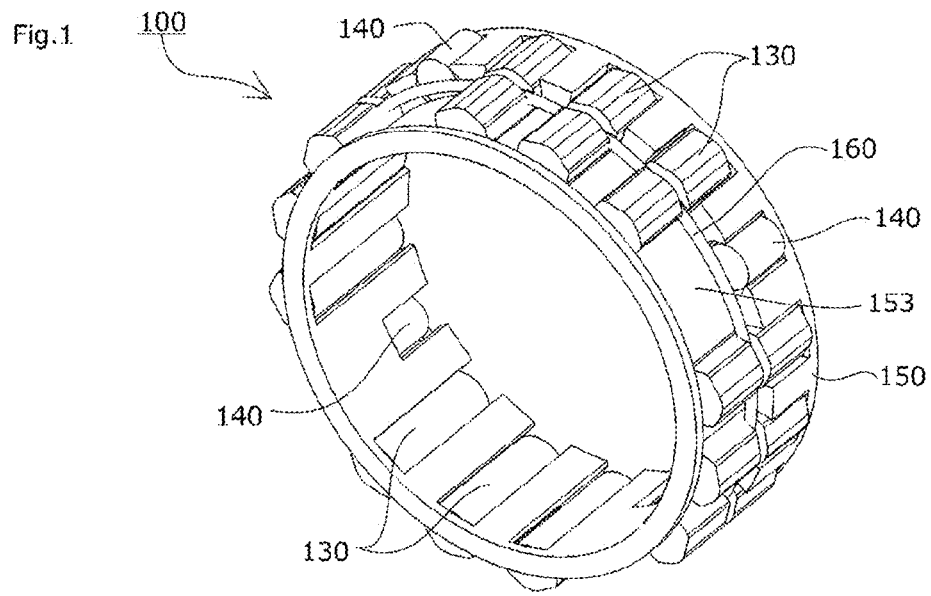
FIG. 1 is a perspective view of a cam clutch unit according to Embodiment 1 of the present invention.
Figure 2:
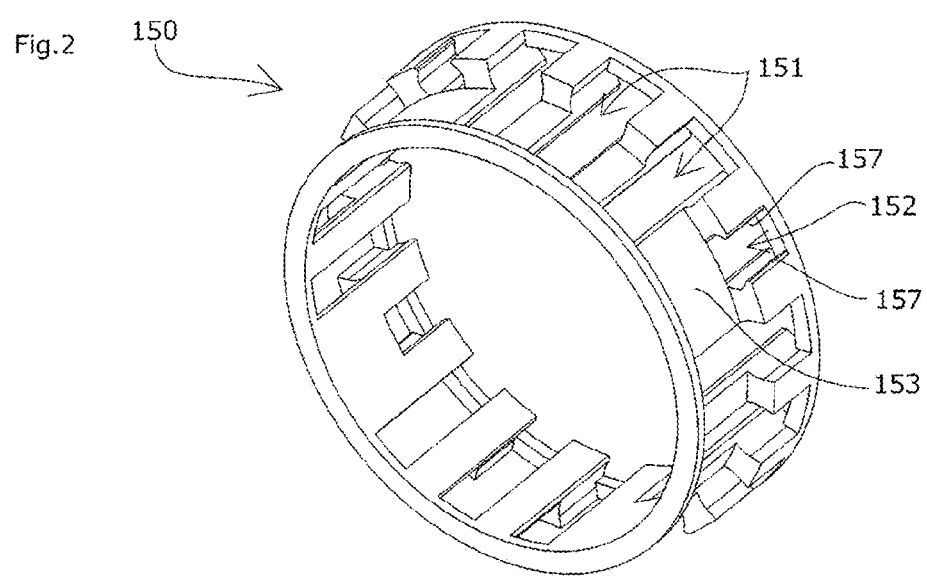
FIG. 2 is a perspective view of a cage ring of the cam clutch unit shown in FIG. 1.
Figure 3:
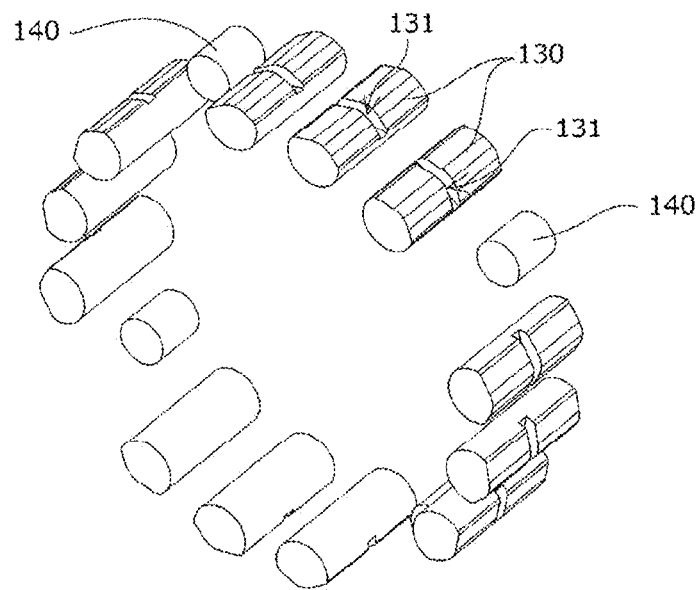
FIG. 3 is a perspective view of cams and rollers of the cam clutch unit shown in FIG. 1.

A cam clutch unit 100 according to Embodiment 1 of the present invention includes, as components that are arranged in annular space between trajectory planes of an inner ring and an outer ring (not illustrated) provided so as to be coaxially rotatable relative to each other, a plurality of cams 130 that serve as engagement elements for transmitting and blocking a torque between the inner ring and the outer ring, a plurality of rollers 140 for freely rotating the inner ring and the outer ring, a cage ring 150 that includes a plurality of pocket portions 151 and 152 that restrict relative movement of the cams 130 and the rollers 140 in the circumferential direction, and an annular spring 160 that biases the plurality of cams 130 in a direction in which the cams 130 mesh with the inner ring and the outer ring, as shown in FIGS. 1 to 3.

As shown in FIG. 3, each of the plurality of cams 130 has, in a central portion in the axial direction thereof, a groove-shaped engagement portion 131 that is engageable with the annular spring 160.

In the present embodiment, as shown in FIGS. 9 to 13 that have been described above, similarly to the cam clutch unit 500, the engagement portion 131 has an inclined shape in which a protrusion is formed at an eccentric position, and, by the spring 160 pressing the protrusion of the engagement portion 131, the cam 130 is biased to the inner ring side, and is biased so as to oscillate in a direction in which the cam 130 operates.

As shown in FIG. 3 and the like, the plurality of rollers 140 do not have any grooves or steps, and, in the present embodiment, the length in the axial direction of each roller 140 is smaller than or equal to the length in the axial direction of one side of the cam 130 excluding the engagement portion 131.

In the present embodiment, the outer peripheral edge portions of the two end surfaces of the roller 140 are chamfered, and thereby the cam clutch unit can be smoothly inserted into the inner and outer rings.

The cage ring 150 includes pocket portions 151 that accommodate the cams 130 and restrict relative movement of the cams 130 in the circumferential direction, and pocket portions 152 that accommodate the rollers 140 and restrict relative movement of the rollers in the circumferential direction.

In the present embodiment, the cage ring 150 includes eight pocket portions 151 that accommodate the cams 130 and four pocket portions 152 that accommodate the rollers 140, the eight pocket portions 151 and the four pocket portions 152 are arranged spaced evenly apart in the circumferential direction, and the pocket portions 152 that accommodate the rollers 140 are arranged at positions not interfering with the spring 160 in the axial direction, only on one side of the spring 160.

In the pocket portions 151, movement of the cams 130 in the radial direction is restricted at central portions in the axial direction thereof by the spring 160.

In addition, claw portions 157, which allow the roller 140 to be inserted from the outer ring side due to the roller 140 elastically deforming, and restrict movement of the roller 140 in the radial direction while the roller 140 is accommodated, are provided on respective surfaces of the pocket portion 152 that accommodates the roller 140, the surfaces being adjacent to the roller 140, and thus ease of insertion is realized, and the roller 140 can be held after being inserted.

In addition, the cage ring 150 is provided with a lubrication adjusting portion 153 that can hold a lubricant such as grease or oil, at a position opposing, in the axial direction, the pocket portion 152 that accommodates the roller 140, with the spring 160 disposed between the lubrication adjusting portion 153 and the pocket portion 152.

By adopting such a configuration, for example, when the inner ring is supported by a shaft extending from the front-left side in the figure in a cantilever fashion, it is possible to arrange the rollers 140 at only positions on the rear-right side on which the shaft wavers most due to deflection of the shaft or the like, and to suppress an increase in extra rolling resistance.

Note that, in the present embodiment, 12 cams 130 and four rollers 140 are arranged, but any numbers of cams 130 and rollers 140 may be arranged in any fashion.

In addition, the cams 130 may have any cross-sectional shape, and, for example, may have a sprag-like shape.

Figure 4:
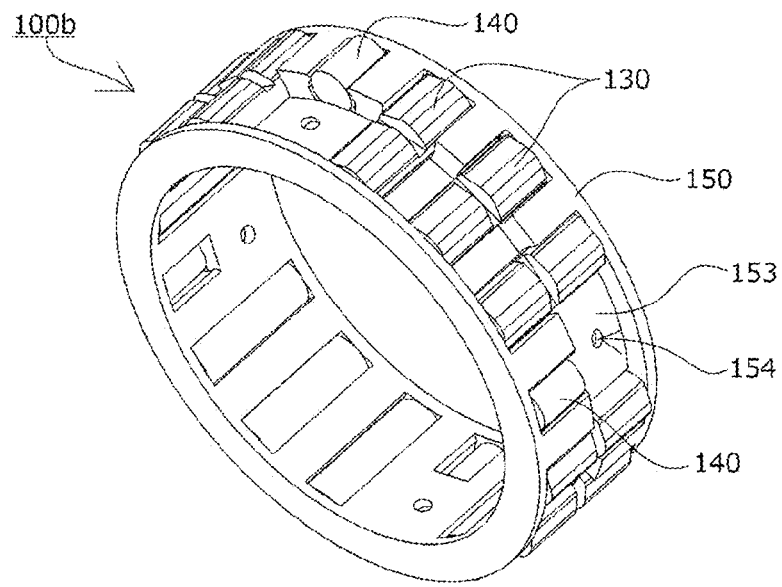
FIG. 4 is a perspective view of a cam clutch unit according to Embodiment 2 of the present invention.

A cam clutch unit 100b according to Embodiment 2 of the present invention is configured such that, as shown in FIG. 4, the rollers 140 are alternatingly arranged in the circumferential direction on the two sides in the axial direction relative to the spring (not illustrated).

In addition, in the present embodiment, a configuration is adopted in which an oil flow hole 154 is provided in the lubrication adjusting portion 153 that can hold a lubricant such as grease or oil, so as to optimize flow of the lubricant.

The other configurations are the same as those of Embodiment 1.

By adopting such configurations, for example, the rollers are arranged spaced evenly apart in the axial direction while being arranged spaced evenly also in the circumferential direction, and it is possible to suppress an increase in the extra rolling resistance by shortening the length in the axial direction of the rollers.

Figure 5:
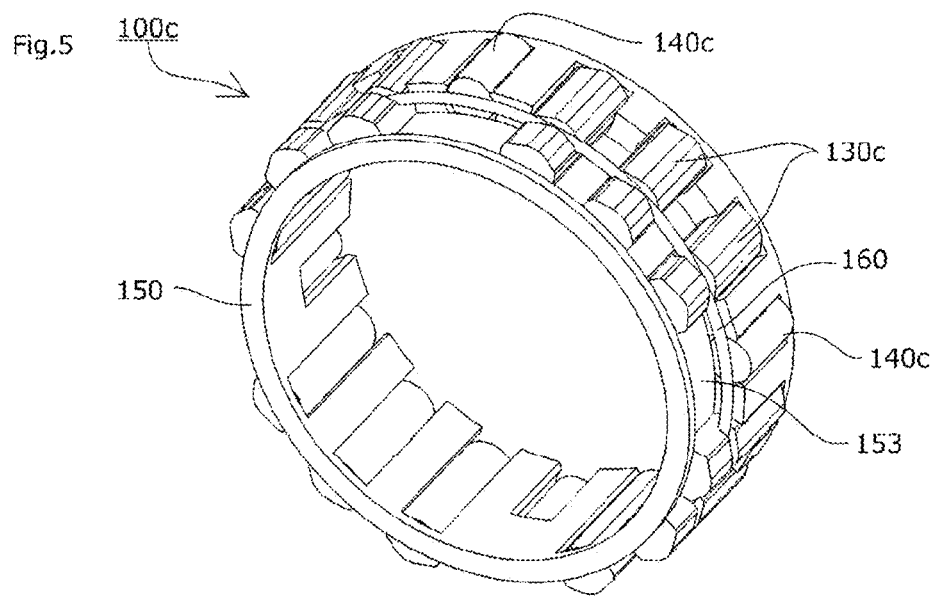
FIG. 5 is a perspective view of a cam clutch unit according to Embodiment 3 of the present invention.

As shown in FIG. 5, in a cam clutch unit 100c according to Embodiment 3 of the present invention, a configuration is adopted in which cams 130c are formed to have different lengths on the two sides in the axial direction relative to the spring 160, and rollers 140c are arranged on the side of longer cams 130c.

The other configurations are the same as those of Embodiment 1.

As in the present embodiment, by changing the arrangement of cams and rollers in the axial direction relative to the spring 160, it is possible to realize optimum design that is based on necessary lengths in the axial direction of rollers.

Figure 6:
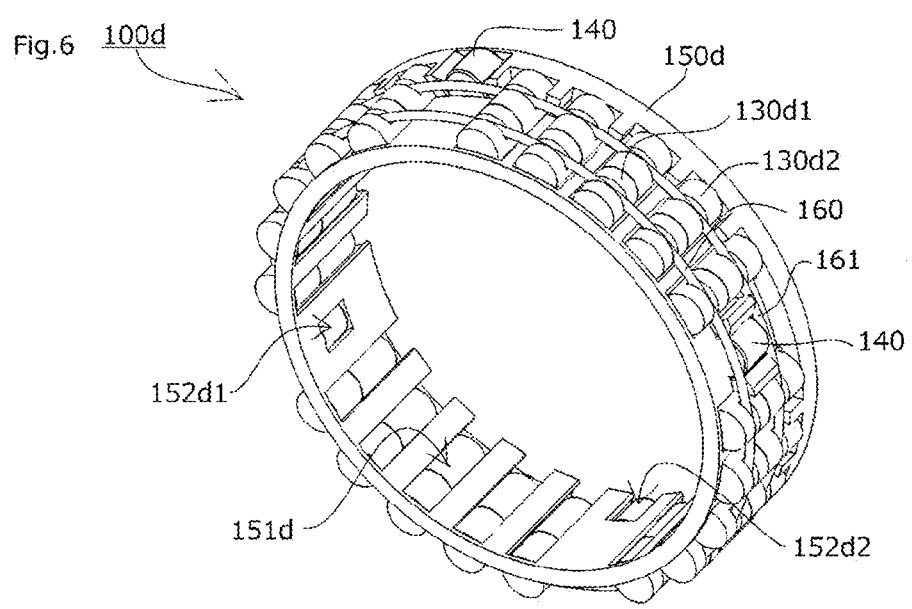
FIG. 6 is a perspective view of a cam clutch unit according to Embodiment 4 of the present invention.
Figure 9:
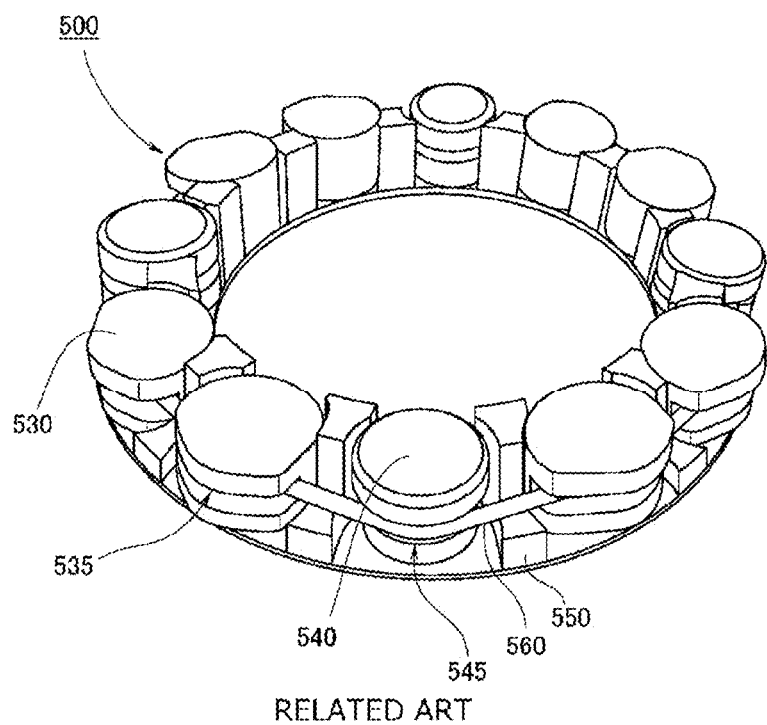
FIG. 9 is a perspective view of a conventional cam clutch unit.
Figure 10:
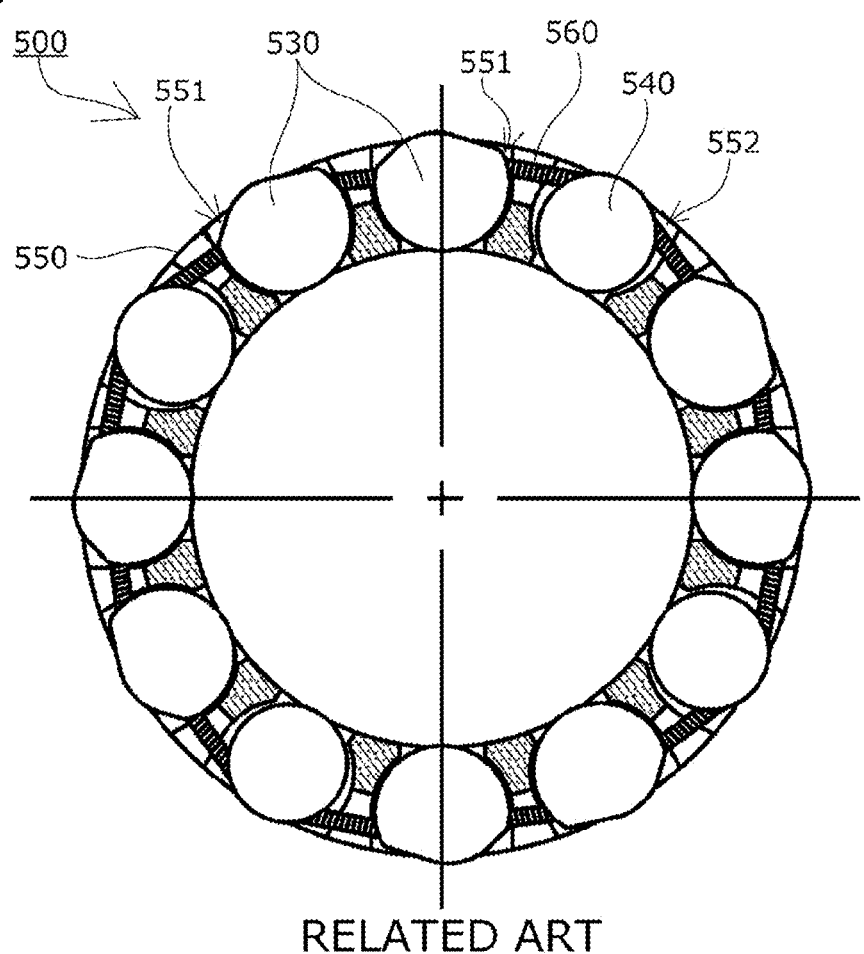
FIG. 10 is a side view of the cam clutch unit shown in FIG. 9 when viewed in the rotation axial direction.
Figure 11:
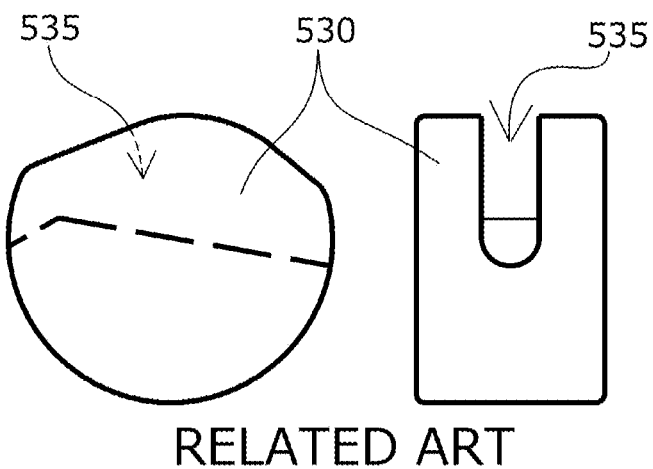
FIG. 11 is a side view and a front view of a cam of the cam clutch unit shown in FIG. 9.
Figure 12:
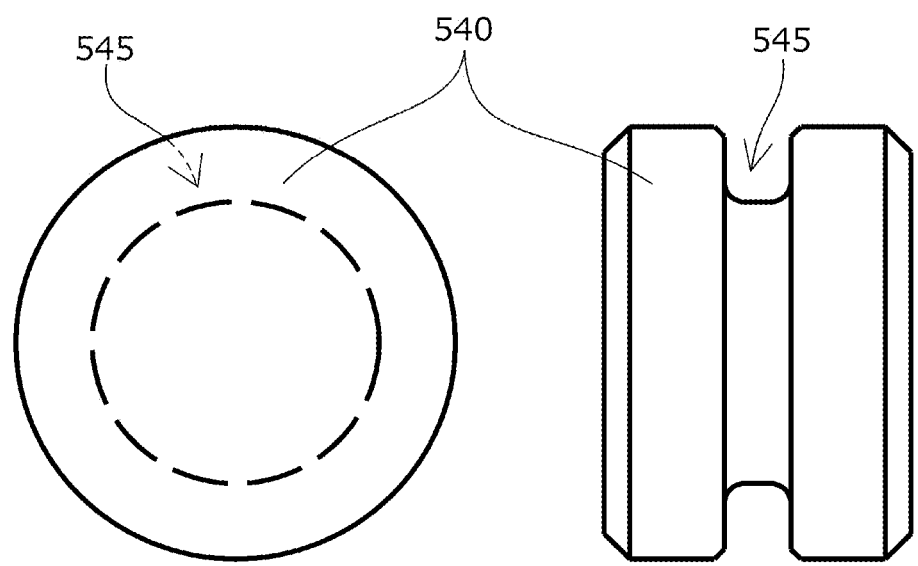
FIG. 12 is a side view and a front view of a roller of the cam clutch unit shown in FIG. 9.
Figure 13:
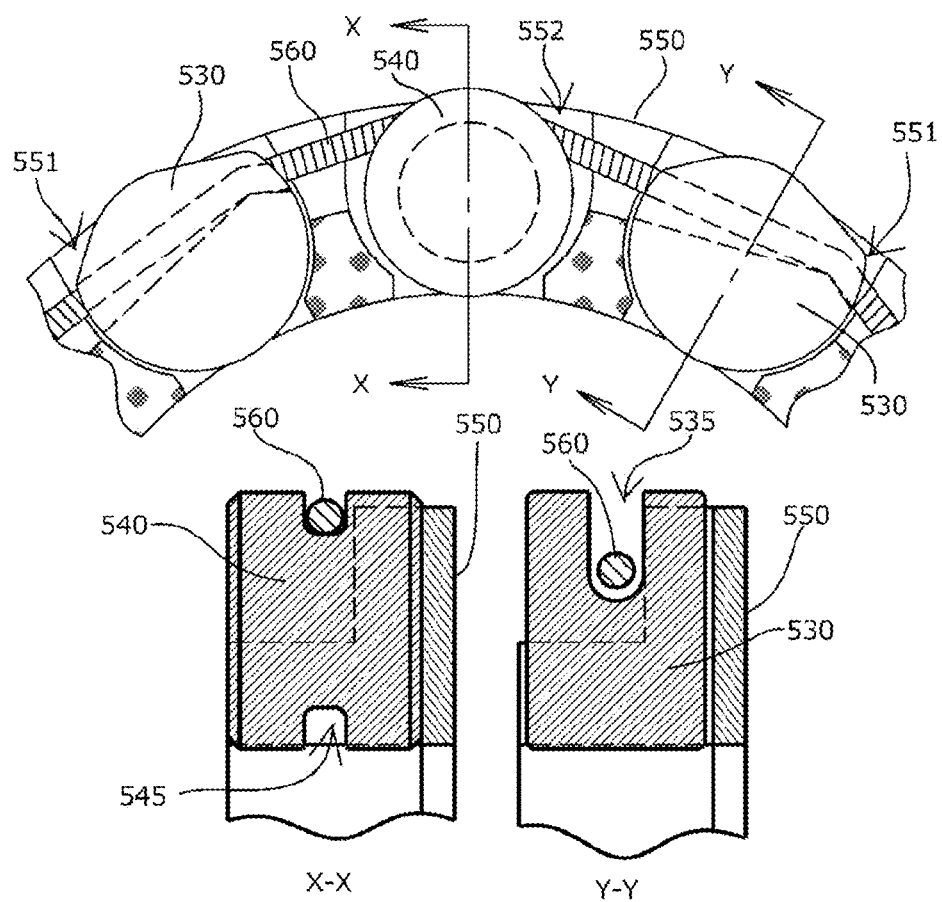
FIG. 13 is a side view and a cross-sectional view of a portion of the cam clutch unit shown in FIG. 9.

As shown in FIG. 6, in a cam clutch unit 100d according to Embodiment 4 of the present invention, cams 130d1 and 130d2 are aligned in the axial direction in pocket portions 151d of a cage ring 150d, and cams 130d1 and 130d2 are independently biased by the spring 160 and a second spring 161, respectively.

A configuration is adopted in which the pocket portions 152d1 and 152d2 that accommodate the rollers 140 are arranged alternatingly in the circumferential direction on two sides in the axial direction relative to the second spring 161, at positions not interfering with the second spring 161 and the spring 160 in the axial direction, only on the second spring 161 side in the axial direction relative to the spring 160.

The length in the axial direction of the pocket portions 152d2 disposed on the second spring 161 side opposite to the spring 160 side is the same as the length in the axial direction of the pocket portions 152d1 disposed at positions between the second spring 161 and the spring 160.

The rollers 140 that are accommodated in the pocket portions 152d2 are arranged to cover areas that are different, in the axial direction, from those of cams 130d2 that are biased by the second spring 161.

As shown in FIG. 7, in a cam clutch unit 100e according to Embodiment 5 of the present invention, cams 130e1 and 130e2 are aligned in the axial direction in pocket portions 151e of a cage ring 150e, and the cams 130e1 and 130e2 are independently biased by the spring 160 and the second spring 161, respectively.

A configuration is adopted in which pocket portions 152e that accommodate the rollers 140 are arranged at positions not interfering with the second spring 161 and the spring 160 in the axial direction, only on the spring 160 side in the axial direction relative to the second spring 161, and on the second spring 161 side in the axial direction relative to the spring 160.

That is to say, the pocket portions 152e are arranged only at positions between the second spring 161 and the spring 160.

As shown in FIG. 8, in a cam clutch unit 100f according to Embodiment 6 of the present invention, cams 130f1 and 130f2 are aligned in the axial direction in pocket portions 151f of a cage ring 150f, and the cams 130f1 and 130f2 are independently biased by the spring 160 and the second spring 161, respectively.

A configuration is adopted in which pocket portions 152f that accommodate the rollers 140 are arranged only on the second spring 161 side that is opposite to the spring 160 in the axial direction, at positions not interfering with the second spring 161 in the axial direction.

In addition, the rollers 140 that are accommodated in the pocket portions 152f are arranged to cover areas that are different, in the axial direction, from those of cams 130f that are biased by the second spring 161.

As in Embodiments 4 to 6, by arranging cams in two rows, it is possible to obtain a cam clutch that is elongated in the axial direction without increasing the length of the cams themselves in the axial direction, and it is possible to improve the reliability of operations of the cams, and cams can be used commonly.

The embodiments of the present invention have been described above in detail, but the present invention is not limited to the above embodiments, and various design changes can be made without departing from the present invention described in the claims.

What is claimed is:

1. A cam clutch unit comprising: a plurality of cams and a plurality of rollers arranged between an inner ring and an outer ring that are provided so as to be coaxially rotatable relative to each other; a cage ring that includes a plurality of pocket portions that restrict relative movement of the cams and the rollers in a circumferential direction; and at least one annular spring that biases the cams,
   wherein the cams each include an engagement portion that is engageable with the spring,
   the pocket portions that accommodate the rollers are provided at positions not interfering with the at least one spring in an axial direction,
   each of the pocket portions that accommodate the plurality of rollers is arranged in an asymmetrical manner in the axial direction relative to the at least one spring.

2. The cam clutch unit according to claim 1,
   wherein the pocket portions that accommodate the rollers are alternatingly provided in the circumferential direction on the two sides in the axial direction relative to the at least one spring.

3. The cam clutch unit according to claim 1,
   wherein the pocket portions that accommodate the rollers are provided only on one side in the axial direction relative to the at least one spring.

4. The cam clutch unit according to claim 1,
   wherein two or more springs are provided at different positions in the axial direction.

5. The cam clutch unit according to claim 1,
   wherein the cage ring includes a lubrication adjusting portion at a position opposing at least one pocket portion with the spring therebetween.

6. The cam clutch unit according to claim 1,
   wherein some or all of the rollers are arranged to cover areas that are different, in the axial direction, from those of the cams.

* * * * *